United States Patent [19]

Hatch

[11] Patent Number: 4,712,032
[45] Date of Patent: Dec. 8, 1987

[54] LIQUID METAL CIRCULATION IN AN ACYCLIC GENERATOR COLLECTOR

[75] Inventor: Burton D. Hatch, Ballston Lake, N.Y.

[73] Assignee: General Electric Company, Pittsfield, Mass.

[21] Appl. No.: 939,500

[22] Filed: Dec. 8, 1986

[51] Int. Cl.⁴ .................................... H02K 31/00
[52] U.S. Cl. ................................... 310/178; 310/219
[58] Field of Search .......... 310/178, 219, 232, 102 A, 310/64, 11, 248; 322/48; 318/253

[56] References Cited

U.S. PATENT DOCUMENTS

| | | | |
|---|---|---|---|
| 2,979,630 | 4/1961 | Bishop | 310/178 |
| 3,211,936 | 10/1965 | Harvey | 310/178 |
| 3,453,467 | 7/1969 | Harvey | 310/178 |
| 3,546,508 | 12/1970 | Harvey | 310/219 |
| 3,705,995 | 12/1972 | Chaberie | 310/178 |
| 3,984,715 | 10/1976 | Kullmann et al. | 310/219 |
| 4,168,445 | 9/1979 | Hatch | 310/219 |
| 4,168,446 | 9/1979 | Hatch | 310/178 |
| 4,186,321 | 1/1980 | Marshall | 310/178 |
| 4,207,486 | 6/1980 | Hatch | 310/178 |
| 4,260,922 | 4/1971 | Hatch | 310/219 |
| 4,266,154 | 5/1981 | Marshall | 310/178 |
| 4,284,918 | 8/1981 | Cannell | 310/178 |
| 4,314,171 | 2/1982 | Hatch | 310/178 |
| 4,399,381 | 8/1983 | Chabrerie | 310/178 |

Primary Examiner—R. Skudy
Attorney, Agent, or Firm—Bailin L. Kuch; Robert A. Cahill

[57] ABSTRACT

To minimize the effects of magnetohydrodynamic surge forces acting on the liquid metal in the collector gap of an acyclic generator, fluid flow impedance members in the form of annular, axially spaced compliant brushes are disposed in the outboard liquid metal containment gap defined between closely spaced, stator and rotor stepped surface formations. These brushes impede the communication to the liquid metal in this containment gap of pressure fluctuations generated in the liquid metal in the collector gap resulting from variations in the generator current transiting the collector gap. A hydrostatic pressure head may thus be maintained consistently at a location intermediate the collector and containment gaps for pumping the liquid metal in a recirculating path.

12 Claims, 2 Drawing Figures

LIQUID METAL CIRCULATION IN AN ACYCLIC GENERATOR COLLECTOR

BACKGROUND OF THE INVENTION

The present invention relates to high DC current acyclic or homopolar generators and particularly to the circulation of liquid metal in the collectors thereof.

A goal of present research and development efforts is to develop smaller, ultra-high current acyclic generators of dramatically increased power density. To this end, high current density field coils, such as supercooled or superconducting field coils, are utilized to provide the requisite high density magnetic field. This coupled with dramatic increases in the peripheral velocity of the rotor can develop DC current outputs in the megamp range. That is, the high peripheral velocity affects the voltage which, when combined with the high current, results in high power density. To accommodate such high DC current magnitudes and peripheral velocities, liquid metal collectors are a virtual necessity to reliably handle current transport between the rotor and stator of the generator.

At such high currents and peripheral velocities, control of the liquid metal, typically a sodium-potassium eutectic (NaK), becomes extremely difficult due to the myriad forces acting on the liquid metal. Obviously, the liquid metal must continuously wet the rotor and stator collector surfaces and completely fill the gaps therebetween to avoid arcing and undue losses. In addition, the current carried by the liquid metal, coupled with the physical agitation thereof during high current, high velocity generator operation, generates considerable heat in the liquid metal, which must be removed if it is not to raise its resistivity and thus increases losses. Thus, it is important that the liquid metal be continuously removed from the collector regions, cooled and returned thereto in recirculating fashion, all without creating voids in the gaps between collector surfaces.

Complicating these objectives is the force exerted on the liquid metal resulting from the interaction of the generator current flowing therethrough and the magnetic field associated therewith. This outwardly directed Lorentz force tends to drive the liquid metal out of the collector gaps and is a direct function of the current magnitude. Thus, as the generator current is increased, Lorentz expulsion forces become a significant factor. In addition, the generator current coacts with the component of the generator magnetic field existing in the collector gap which is normal to the current path therethrough to develop forces driving the liquid metal in a circumferential direction opposite to the direction of rotor rotation.

In addition to the above-noted magnetohydrodynamic motoring forces acting on the liquid metal in the collector gaps, mechanical forces exerted on the liquid metal due to the high rotational velocity of the rotor must also be taken into consideration. First, there is a viscous pumping force which tends to drive the liquid metal in the same circumferential direction in which the rotor collector surface is moving. Thus, this pumping force acts in the opposite circumferential direction to the magnetohydrodynamic forces generated by the coaction of the generator current and the generator field in the collector gaps. At zero generator current, this viscous pumping force causes the liquid metal in the collector gaps to revolve circumferentially at velocity equal to one-half of the rotor peripheral velocity. As generator current is increased, so does the counteracting circumferential magnetohydrodynamic force. At some current value, circumferential motion of the liquid metal will be halted, and at higher values, the liquid metal will be driven in a direction opposite to the direction of rotor rotation. Such counter-rotation of the liquid metal significantly increase viscous drag on the rotor, resulting in higher losses.

Finally, there are the radially directed, centrifugal pumping forces acting on the liquid metal due to the rotational motion of the rotor surfaces in contact therewith.

It is seen that these liquid metal pumping or motoring forces vary with generator current and rotor velocity. Thus, it becomes extremely difficult to develop a design capable of affording the requisite control of the liquid metal over a wide range of operating conditions from zero to rated generator current and zero to rated rotor velocity.

In addition to the foregoing considerations, it would be desirable to utilize these magnetohydrodynamic and mechanical forces to reliably recirculate the liquid metal through the collector region under all operating conditions and thus avoid the added complexity and cost of an external pump to move the liquid metal in a recirculating path through the collector gaps.

It is accordingly an object of the present invention to provide an improved liquid metal collector for an acyclic generator.

An additional object is to provide a liquid metal collector of the above-character, wherein the inherent dynamic forces acting on the liquid metal during generator operation are advantageously controlled such as to achieve circulation of the liquid metal through the collector region.

Yet another object is to provide a liquid metal collector of the above-character, wherein recirculation of the liquid metal through the collector region pursuant to extracting heat therefrom is achieved virtually independently of generator current and without resort to an external recirculating pump.

A still further object is to provide a liquid metal collector of the above-character having improved efficiency and capable of handling extremely high power densities.

Another object is to provide a liquid metal collector of the above character which is efficient in design and reliable in operation over a wide range of operating conditions and over a long service life.

Other objects of the invention will in part be obvious and in part appear hereinafter.

SUMMARY OF THE INVENTION

In accordance with the present invention, there is provided an acyclic generator wherein the magnetohydrodynamic forces acting on the liquid metal in the collector gap are controlled such as to minimize their prejudical effects on the recirculation of liquid metal through the collector gap pursuant to the extraction of heat therefrom. To this end, at least one and preferably a plurality of axially spaced fluid flow impedance members are disposed to span a containment gap defined between closely spaced, stator and rotor stepped surface formations located to the outboard side of the collector gap which is in liquid metal communication with the containment gap. These impedance members, in the form of braided filament brushes, impede the communication to the liquid metal in the containment gap of pressure fluctuations generated in the liquid metal in the collector gap resulting from variations in the generator current transiting the collector gap. As a consequence, the dynamic viscous pumping forces exerted on the liquid metal in the containment gap dominates opposing magnetohydrodynamic pumping forces exerted on the liquid metal in the collector gap such as to produce a hydrostatic pressure head which is at a balance point intermediate the collector and containment gaps over a wide range of generator current. By locating the entry into at least one outlet passage in the vicinity of this balance point, liquid metal is pumped out of the collector region through this outlet passage for recirculation through a heat exchanger and at least one inlet passage located axially to the other side of the collector gap from the outlet passage. Thus, effective recirculation and cooling of the liquid metal is achieved to maintain a cool running liquid metal collector regardless of variations in generator current.

The invention accordingly comprises the features of construction, combination of elements and arrangement of parts which will be exemplified in the construction hereinafter set forth, and the scope of the invention will be indicated in the claims.

For a fuller understanding of the nature and objects of the invention, reference should be had to the following detailed description taken in conjunction with the accompanying drawings, in which:

FIG. 1 is a fragmentary, sectional view of an acyclic generator incorporating a liquid metal collector constructed in accordance with the present invention; and FIG. 2 is a sectional view taken along line 2—2 of FIG. 1.

Corresponding reference numerals refer to like parts throughout the several views of the drawings.

DETAILED DESCRIPTION

Figure 1:
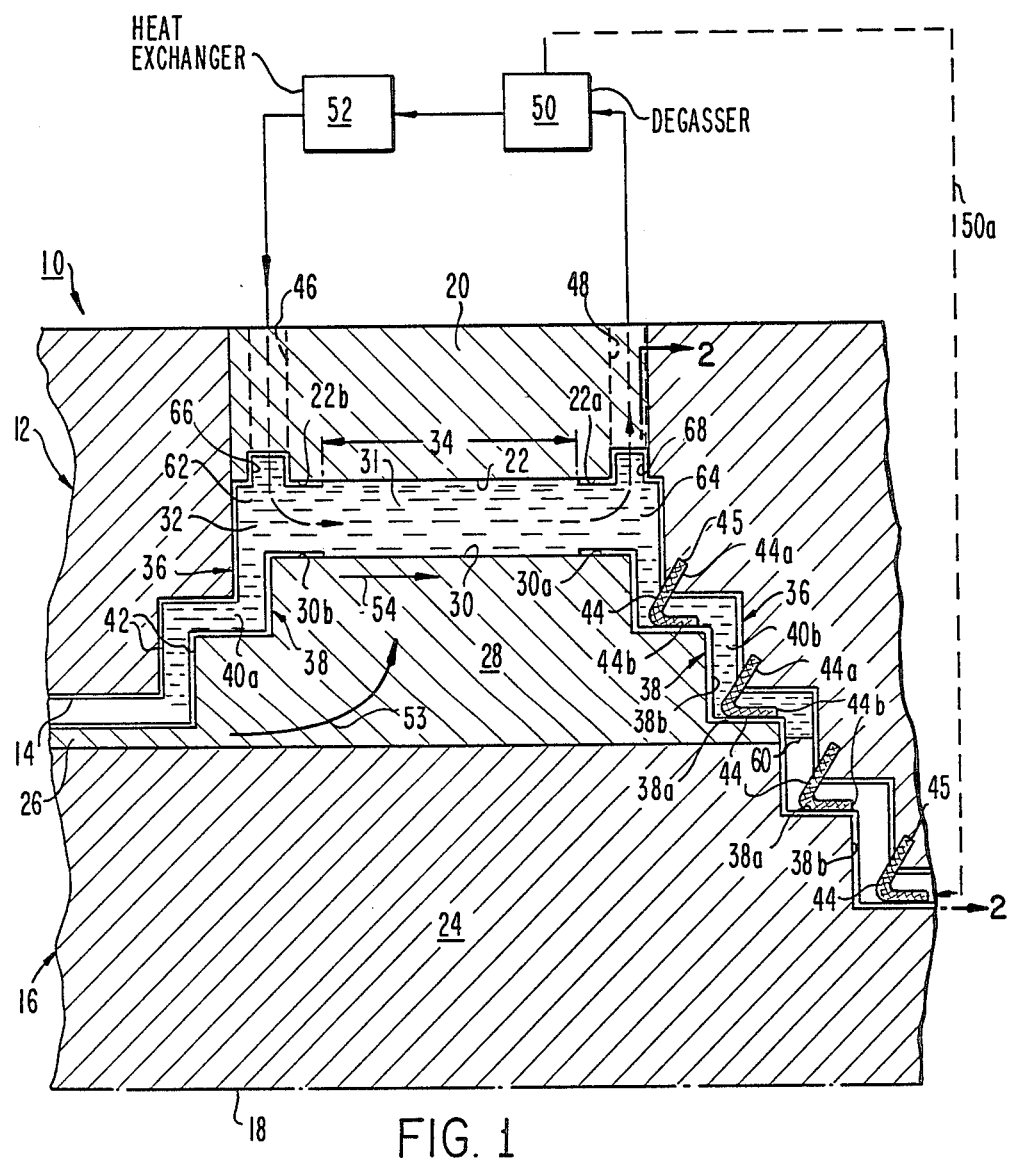

Referring to FIG. 1, an acyclic or homopolar generator, generally indicated at 10, includes a stator, generally indicated at 12, having a bore 14 accommodating a rotor, generally indicated at 16 and journalled for rotation about an axis 18 by suitable bearings (not shown). The stator includes a terminal member 20 of highly conductive metal, such as copper, which is provided with an annular collector surface 22. The rotor may be entirely made of a lightweight highly conductive, solid cylinder of aluminum (or aluminum-beryllium alloy) or may include an iron core 24 for carrying the magnetic flux generated by field coils (not shown). Mounted on any such iron rotor core is a highly conductive metallic sleeve or cylinder 26 of copper or aluminium for carrying the main generator current. Integrally formed at each end of cylinder 26 (the right end being shown in FIG. 1) is an annular rotor collector member 28 which presents a cylindrical collector surface 30 in uniformly gapped relation with stator collector surface 22. To accommodate main-generator current transport between collector surfaces 22 and 30, gap 31 therebetween is filled with a highly conductive liquid metal 32, such as a sodium-potassium eutectic (NaK). The surfaces of the stator and rotor to each side of this collector gap are fashioned having closely spaced, conforming stator and rotor stepped surface formations, generally indicated at 36 and 38, respectively, which define therebetween an inboard (left) containment gap 40a and an outboard (right) containment gap 40b both in fluid communication with collector gap 31. Except for axial segments 34, the conforming circumferential surfaces of the stator and rotor are covered with an insulative coating 42, which may take the form of sprayed alumina which is subsequently vacuum impregnated with epoxy. Consequently, current transport between the stator and rotor is limited to the well-defined axial segments 34 of the stator and rotor collector surfaces 22 and 30, respectively, which are devoid of insulative coating 42, and the liquid metal 32 filling annular collector gap 31.

Figure 2:
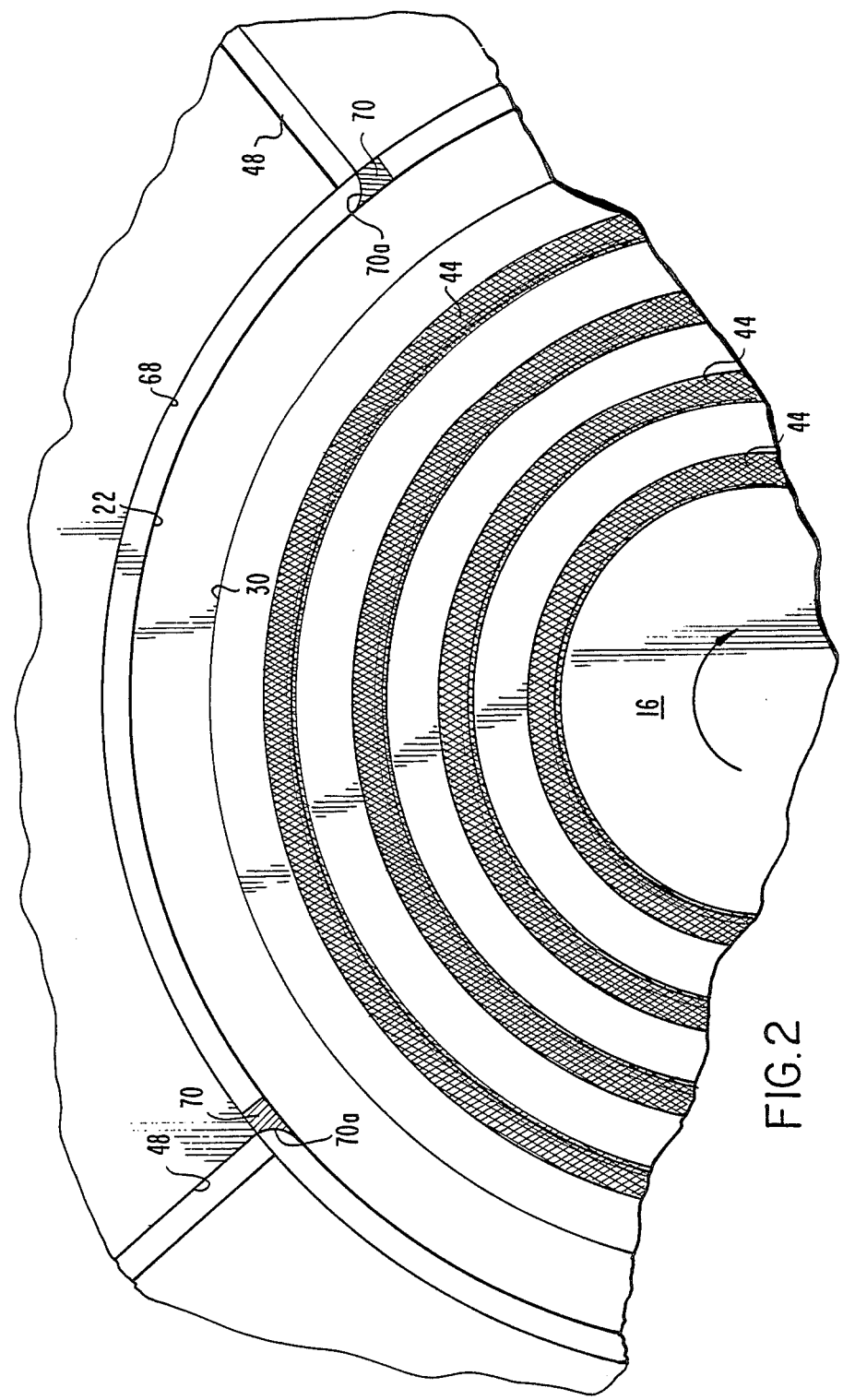

In accordance with the present invention, at least one and preferably a plurality of annular fluid flow impedance members in the form of brushes 44 are disposed to span containment gap 40b at axially spaced locations, as seen in FIGS. 1 and 2. These brushes are preferably formed of a compliant mesh of metal filaments in an approximate L-shaped configuration with their generally radially oriented leg portions 44a mounted by stator 12. The axially oriented leg portions 44b thereof are at least initially disposed in respective rubbing relation with axially oriented, cylindrical land surface segments 38a of rotor stepped surface formation 38. While electrical conductivity is of no concern, braided copper filaments, such as disclosed in commonly assigned U.S. Pat. No. 4,186,321, are preferred brush materials due to their proven efficacy in liquid metal collector applications. Other braided filament materials, which will compliantly maintain a narrow gap between the brush and the respective adjacent rotor surface may be used. An important characteristic of brushes 44 is they exhibit a degree of porosity to the liquid metal such that liquid metal may flow radially in containment gap 40b, but at a significantly reduced rate as compared to the situation where the brushes are omitted from the containment gap.

While brushes 44 may be mounted to stator 12 in several ways, FIG. 1 illustrates brush legs 44a being electron beam welded to the stator while being lodged in annular slots 45 formed in stator stepped surface formation 36. However, it may be preferable to releasably clamp the brushes in place such as to be replaceable should they become worn or damaged. While the brushes are shown bearing against cyclindrical land surface segments 38a, they could bear against radial riser surface segments 38b. Also, brushes 44 could be mounted by rotor 16 with their free leg portions bearing against surface segments of stator stepped surface formation 36.

Returning to FIG. 1, liquid metal 32 is supplied to annular collector gap 31 via one or more inlet passages 46 situated to the inboard or illustrated left side of the collector gap and withdrawn therefrom via one of more outlet passages 48 formed in stator 12 to the outboard side of the collector gap. These passages are connected in a recirculating loop which includes a degasser 50 and a heat exchanger 52. Degasser 50 removes any inert cover gas, such as nitrogen, entrained in the liquid metal and returns the recovered gas, as indicated diagrammatically at 50a, to the radially innermost end of containment gap 40b where it resupplies the inlet cover gas to prevent oxidation of the liquid metal. It will be appreciated that recovered cover gas is also returned to the radially innermost end of containment gap 40a to the inboard side of collector gap 31. The heat exchanger extracts heat from the liquid metal prior to its return through inlet passages 46 to the collector gap.

As is well understood in the art, while generator current is flowing radially through the collector gap, leading, for example, from a path in rotor 16 generally indicated by arrow 53, the interaction of this current and its magnetic field generates a force on the liquid metal 32 within the collector gap between the uninsulated collector surfaces 22, 30 which is to the right or in the outboard direction as indicated by arrow 54 in FIG. 1. This Lorentz force is utilized to advantage to propel the liquid metal axially through the collector gap from the inlet passages 46 toward the outlet passages 48.

Acting in opposition to these Lorentz pumping forces attempting to expel liquid metal from collector gap 31 are the viscous centrifugal pumping forces exerted on the liquid metal in containment gap 40b by the high surface speed of rotor stepped surface formation 38, particularly the riser surface segments 38b, during high velocity rotation of rotor 16. Supplementing these centrifugal viscous pumping forces is the cover gas pressure existing at liquid metal-cover gas interface 60 in containment gap 40b. When the rotor is stationary the cover gas pressures are equal throughout the contained gas volume. Only the centrifugal forces change this. It will be appreciated that gas pressures (and liquid metal pressures) are higher at the larger radius locations. The higher pressures in the degasser 50 are thus available to recirculate the gas to smaller radius locations along the path 50a.

It is desirable to achieve a balance point between these opposing dynamic pumping heads which is located approximately at the entries into outlet passages 48 and thus provide an effective hydrostatic pumping head propelling the liquid metal in the desired recirculating path through outlet passages 48, degasser 50, heat exchanger 52 and inlet passages 46. To this end, as an important feature of the present invention, insulative coatings 42 are extended onto the marginal portions 22a and 30a of the stator and rotor collector surfaces to an extent necessary to isolate the liquid metal portion proximate the entry into passages 48 from the highest level of generator current conducted across collector gap 31, taking into account fringing current paths at the right edge of axial extent 34. Thus, this portion of the liquid metal is not subjected to Lorentz forces, and consequently, for a range of generator currents, the Lorentz dynamic head existing in collector gap 31 can be converted to a hydrostatic head located substantially at or somewhat inboard or to the left of the outlet passage entries.

Unfortunately, the Lorentz pumping forces are a function of generator current which, in certain variable current applications, can rapidly fluctuate over a wide range. The consequent pulsations of the Lorentz pumping forces can drive their balance point with the centrifugal pumping forces well out into containment gap 40b. By disposing annular brushes 44 to span this containment gap at a plurality of axial locations, the effects of the pulsating Lorentz dynamic pumping head on the centrifugal dynamic pumping head are attenuated. That is, since the rate of flow of liquid metal through the brush interstices in response to generator current induced Lorentz pulsations is materially impeded, communication of the resulting pressure fluxuations to the liquid metal in containment gap 40b beyond the brushes from the collector gap 30 is dramatically retarded. Brushes then, in effect, act as liquitd metal flow impedance members to absorb and, consequently drastic movement of the balance point between the opposing Lorentz and centrifugal dynamic heads out into the containment gap can be effectively prevented.

It will be noted in FIG. 1 that the insulative coatings 42 may also extended onto the inboard marginal surface portions 22b and 30b of the stator and collector surfaces. As a consequence, the exits of inlet passages 46 are also removed from the path of generator current through the liquid metal in collector gap 31. There is thus provided an annular chamber 62 containing liquid metal supplied from inlet passages 46 which is relatively free of magnetohydrodynamic pumping effects, i.e., both the axial Lorentz forces and the circumferential forces generated by the coaction of the generator current and the axial component of the generator magnetic field exiting the collector gap. Thus, the predominate pumping forces acting on the liquid metal in annular chamber 62 are the viscous drag circumferential pumping forces generated by the rapidly rotating rotor surface bounding the chamber. This pumping force is utilized to advantage in rapidly distributing the cooled liquid metal supplied via inlet passages throughout chamber 62 prior to its flow into collector gap 31.

The same is true beyond the outboard end of the collector gap wherein an annular channel 64 receives the liquid metal flowing axially from the collector gap and in which the liquid metal is relatively unaffected by the circumferential magnetohydrodynamic pumping forces existing in the collector gap. Thus, the liquid metal in chamber 64 is distributed circumferentially by viscous pumping forces and pumped out into outlet passages 48 by the hydrostatic pressure head located therein.

To enhance circumferential viscous pumping of the liquid metal in chambers 62 and 64, annular grooves 66 and 68, respectively, may be formed in the bounding stator surface. The exits of inlet passages 46 are located in the base of groove 66, while the entries of outlet passages 48 are located in the base of groove 68. Preferably, the surfaces of these grooves are also covered with insulative coating 42 to further increase the clearance with the current path through the collector gap. At least groove 68 may be fitted with separate plugs 70, as seen in FIG. 2, each having a scoop-shaped surface 70a positioned to intercept circumferentially flowing liquid metal and divert it into the entry ends of each outlet passage.

It is thus seen that the objects set forth above, including those made apparent from the preceding description, are efficiently attained, and, since certain changes may be made in the above construction without departing from the scope of the invention, it is intended that all matter contained in the above description or shown in the accompanying drawings shall be interpreted as illustrative and not in a limiting sense.

What is claimed as new and desired to secure by Letter Patent is:

1. An acyclic generator comprising, in combination:
A. a stator:
B. a rotor mounted for rotation about an axis relative to said stator;
C. an annular rotor collector surface formed on a circumferential surface of said rotor;
D. an annular stator collector surface formed in a circumferential surface of said stator in closely spaced relation with said rotor collector surface to define therebetween an annular collector gap;
E. a first stepped surface formation formed in said stator circumferential surface axially to at least one side of said stator collector surface;

F. a second stepped surface formation formed in said rotor circumferential surface axially to said one side of said stator collector surface, said first and second stepped surface formations being in conforming, closely spaced relation to define therebetween a containment gap in fluid communication with said collector gap;

G. insulative coatings covering said first and second stepped surface formations;

H. liquid metal filling said collector gap and at least a portion of said containment gap; and I. at least one annular fluid flow impedance member immersed in said liquid metal and spanning said containment gap to retard the communication of pressure fluxuations generated in said liquid metal in said collector gap resulting from variations in current transiting said collector gap to said liquid metal beyond said impedance member from said collector gap.

2. The acyclic generator defined in claim 1, which further includes at least one outlet passage formed in said stator and having a liquid metal entry thereinto located between said stator collector surface and said first stepped surface formation.

3. The acyclic generator defined in claim 2, wherein said entry is axially, insulatively spaced from the path of current transiting said collector gap.

4. The acyclic generator defined in claim 3, which further includes an annular groove formed in said stator circumferential surface intermediate said stator collector surface and said first stepped, surface formation, said outlet passage liquid metal entry being located in the base of said groove.

5. The acyclic generator defined in claim 4, which further includes a plug situated in said groove for diverting into said outlet passage liquid metal entry said liquid metal flowing in said groove.

6. The acyclic generator defined in claim 3, wherein said impedance member is in the form of a at least one compliant, annular brush formed of braided filaments.

7. The acyclic generator defined in claim 3, wherein said impedance member is in the form of a plurality of compliant, annular brushes spanning said containment gap at axially spaced locations.

8. The acyclic generator defined in claim 7, wherein said first and second stepped surface tormations are each comprised of radially oriented riser surface segments interconnected by axially oriented land surface segments, said annular brushes being mounted by said stator for extension across said containment gap into essentially wiping engagement with different land surface segments of said second stepped surface formation.

9. The acyclic generator defined in claim 7, wherein said insulative coatings are extended over the surfaces of said groove and onto said marginal circumferential surface portions of said stator and rotor collector surfaces from said surfaces of said first and second stepped surface formations, whereby to axially space said outlet passage liquid metal entry from said current path.

10. The acyclic generator defined in claim 9, which further includes at least one inlet passage formed in said stator axially to the other side of said stator collector surface from said outlet passage and having a liquid metal exit therefrom into said collector gap.

11. The acyclic generator defined in claim 10, which further includes an addition annular groove formed n said stator circumferential surface, said inlet passage liquid metal exit being located in the base of said additional groove.

12. The acyclic generator defined in claim 11, wherein said insulative coatings are extended over the surfaces of said additional groove and onto marginal circumferential surface portions of said stator and rotor collector surfaces, whereby to axially space said inlet passage exit from said current path.

* * * * *